United States Patent [19]

Thom

[11] Patent Number: 5,482,005
[45] Date of Patent: Jan. 9, 1996

[54] ANIMAL CAGE

[75] Inventor: Jerry D. Thom, Sandy, Utah

[73] Assignee: T Kennel Systems, Inc., Kansas City, Kans.

[21] Appl. No.: 157,338

[22] Filed: Nov. 12, 1993

[51] Int. Cl.$^6$ .................................................. A01K 31/00
[52] U.S. Cl. ............................................................. 119/17
[58] Field of Search ................................. 119/19, 17, 15

[56] References Cited

U.S. PATENT DOCUMENTS

| | | |
|---|---|---|
| 1,840,202 | 1/1932 | Kerr. |
| 1,947,698 | 2/1934 | Corbin. |
| 2,516,961 | 8/1950 | Dailey. |
| 2,523,615 | 9/1950 | Fell. |
| 2,979,027 | 4/1961 | Corwin et al.. |
| 3,087,458 | 4/1963 | Bennett. |
| 3,098,465 | 7/1963 | Ivey ............................................ 119/17 |
| 3,177,848 | 4/1965 | Rubricius. |
| 3,292,582 | 12/1966 | Rubricius. |
| 3,307,206 | 3/1967 | Kreuger. |
| 3,318,285 | 5/1967 | Betham. |
| 3,337,394 | 8/1967 | White et al.. |
| 3,550,558 | 12/1970 | Sachs. |
| 3,626,902 | 12/1971 | Orfei .......................................... 119/17 |
| 3,698,360 | 10/1972 | Rubricius. |
| 3,924,571 | 12/1975 | Holman ..................................... 119/19 |
| 4,057,032 | 11/1977 | Dimitriadis. |
| 4,135,339 | 1/1979 | Pawlitschek. |
| 4,336,674 | 6/1982 | Weber. |
| 4,349,436 | 9/1982 | Kaump. |
| 4,460,462 | 7/1984 | Arneson. |
| 4,794,879 | 1/1989 | Thom et al.. |
| 5,148,771 | 9/1992 | Scwuett et al. ....................... 119/19 X |

Primary Examiner—Gene Mancene
Assistant Examiner—Thomas Price
Attorney, Agent, or Firm—Trask, Britt & Rossa

[57] ABSTRACT

A animal cage having an inclined floor, a plurality of upstanding walls mounted on the floor and an opening in the floor panel, positioned proximate an end of the floor panel, for evacuating waste material from the floor is disclosed. A cover, mounted on one of the walls extends over the opening to substantially preclude the housed animal from contacting the material in the opening. The opening is positioned within the floor panel to be spatially removed from the side edges of the floor panel The opening is interconnected with a drain conduit which is substantially sealed except for its intercommunication with the opening and an outlet.

12 Claims, 6 Drawing Sheets 5,482,005

ANIMAL CAGE

BACKGROUND OF THE INVENTION

1. Field of the Invention

This invention relates to animal cages, particularly those adapted for containing small animals. More specifically the invention relates to sanitary systems for use in such animal cages.

2. State of the Art

For many people, the keeping of small animals as pets offers significant enjoyment and benefits. The maintenance of such pets oftentimes requires the provision of a cage or similar structure for purposes of housing the animal. Such cages must be adapted to provide a containment function as well as a sanitary environment.

Maintenance of a sanitary environment is often difficult in such cages. It has been recognized that unsanitary conditions in such cages contributes to the likelihood that the animal may become infected with disease. Recognizing that animals will oftentimes relieve themselves in such cage structures, it becomes of paramount concern that such cages be adapted for ease in cleaning and maintenance to restrict the development or harboring of disease causing genes or viruses.

Throughout history, cage structures have adopted a very typical construction. Such structures have in past included a floor surmounted by a plurality of upstanding walls mounted to that floor. The walls are generally joined to one another along their vertically oriented edges to define an enclosure having an interior area for receiving the animal. Such structures have many times included walls fabricated of a wire or other mesh-like material which permits the animal to see outwardly from within the interior of the structure. Oftentimes a drain or other structure is defined in the cage whereby waste materials may be removed from the cage interior subsequently disposed of.

The issue of maintaining sanitary conditions in animal housing units is particularly acute in kennels. In kennel facilitates which are adapted for maintaining a relatively large population of animals, it is oftentimes the practice that a multiplicity of individualized animal cages are arranged in rows or other configurations to facilitate the individualized housing of an animal population. It is a commonly known fact that in such kennels there exists a significant likelihood that disease may be spread from one diseased animal to another. It has further been found that oftentimes a principal means of transmission of disease in such kennels is the contact of one animal with the excrement of another animal which may be housed within a fairly short spacial distance of the first animal. It follows that in kennel construction it becomes of considerable concern that the waste materials of individual animals be efficiently removed from the individual cages of the kennel while at the same time minimizing, if not eliminating, the possibility of the animals in adjacent cages coming into contact with said waste materials.

Although past efforts in the animal cage construction industry have yielded a number of alternative animal cage constructions. There continues to exist a need for an animal cage structure, which at once provides an easy and efficient means of maintaining sanitary conditions in an individualized cage structure while at the same time facilitating a kennel arrangement wherein sanitary conditions may also be equally maintained.

SUMMARY OF THE INVENTION

An animal cage having a means of isolating the waste materials of an individual housed animal is disclosed. The cage includes a floor panel surmounted by a plurality of upstanding walls. The floor panel has opposing ends. One end of the floor panel is positioned elevationally higher than the second end thereof. This positioning induces a flow of any liquid substance on the surface of the floor panel toward the lower elevational end. Configured in the floor panel proximate the lower end is an opening which extends through the thickness of the front panel. The opening is positioned proximate an upstanding first wall of the cage and spatially removed from the sides of the floor panel. A cover mounted to the first wall extends over the opening in the floor sufficiently to substantially preclude the animal's access to the opening.

The cover may be configured to be positioned spatially above the surface of the floor panel. The cover construction and its orientation defines a plurality of vertically oriented openings between the floor panel and the cover which provide an ingress into the opening defined in the floor panel surface. To achieve some degree of stability, the cover may also be fitted with a plurality of leg-like elements which extend from the cover to the surface of the floor panel.

In some constructions, the cover is adapted to be detachably removed from the wall to permit a user's ready access to the opening for cleaning and maintenance purposes. The opening is fitted on the underside surface of the floor panel with a drain means, such as a drain pan adapted for receiving waste from the opening and directing that waste to a disposal site. In some constructions, the drainage means is substantially sealed to the environment except for its interconnection with the opening and its outlet opening, which is positioned to discharge the waste to a disposal site.

The floor panel is preferably constructed of an impermeable material. One or more walls of the cage structure may also be constructed to have a substantially impermeable surface, which is positioned contiguous with the floor panel. The arrangement of the walls having this impermeable material is adapted to create a substantially fluid-sealed surface, which extends along the plane of the floor surface and upwardly therefrom along the walls so as to define a generally basin like configuration configured to retain a quantity of liquid material which may collect on the surface of the floor panel. This material is then drained through the opening previously discussed.

In some constructions, one or more walls of the cage may be fitted with door panels which are configured to permit ingress and egress to and from the interior of the cage.

The cage may be raised elevationally above the floor or other supporting surface upon which it may rest by a plurality of upstanding legs. These legs may be joined to the floor panel at selected locations on the underside of that floor panel. In many constructions, the legs are positioned at the comers of a polygonally-configured floor panel. In order to achieve the sloped orientation of the floor panel, two or more of the legs may be dimensioned to be elevationally higher than the other legs to thereby orient the floor panel in an inclined orientation.

DETAILED DESCRIPTION OF THE ILLUSTRATED EMBODIMENT

Figure 1:
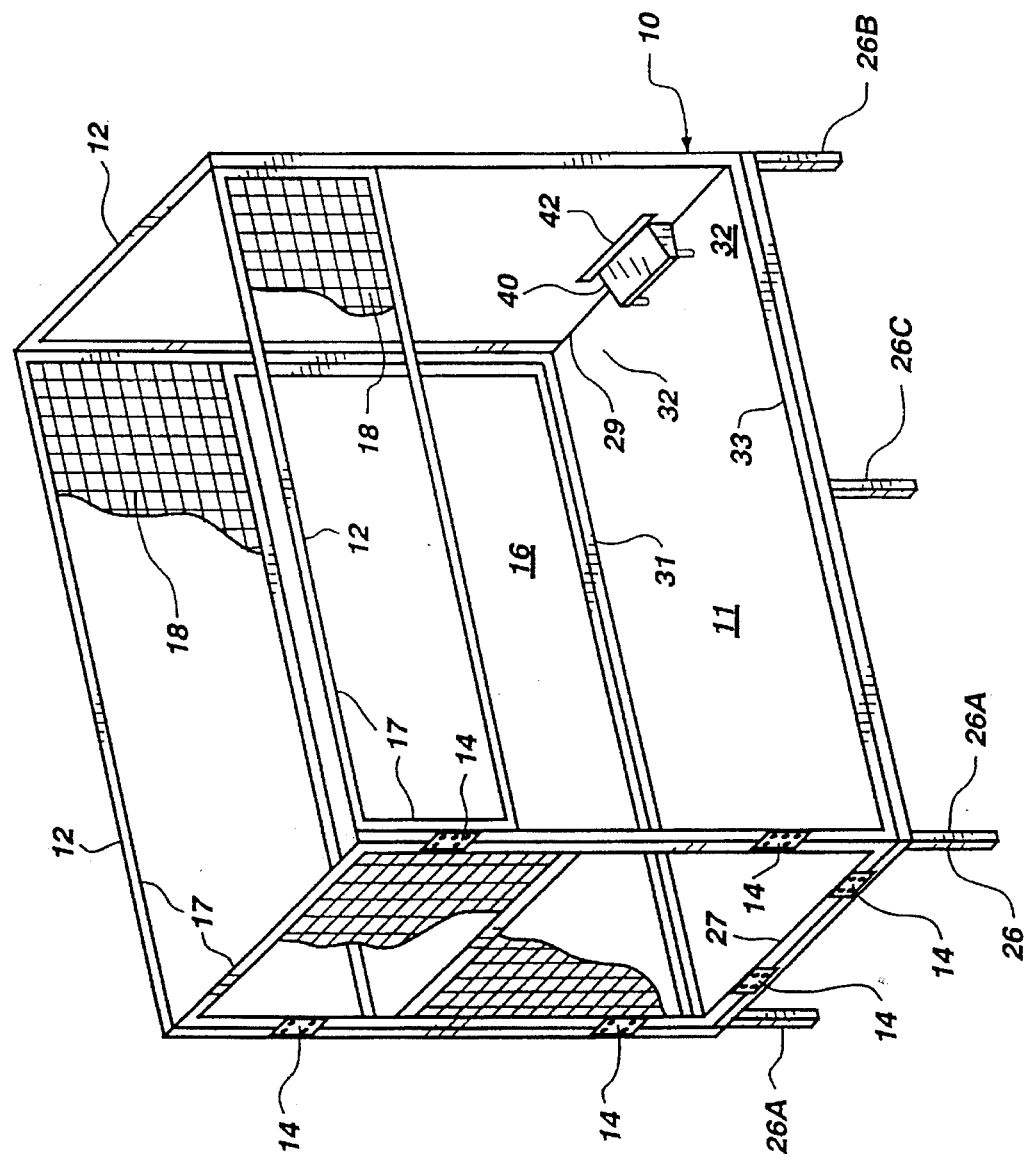
FIG. 1 is an elevational perspective view of an animal cage of the instant invention wherein the side panels are shown in partial section.

As shown in FIG. 1, an animal cage 10 of the instant invention includes a planar and rectangularly configured floor panel 11. The floor panel includes an upper surface which is substantially smooth. Floor panel 11 is preferably manufactured of a non-porous material such as plastic, fiberglass or other synthetic material. The floor panel 11 is surmounted by a plurality of upstanding planar walls 12.

Figure 4:
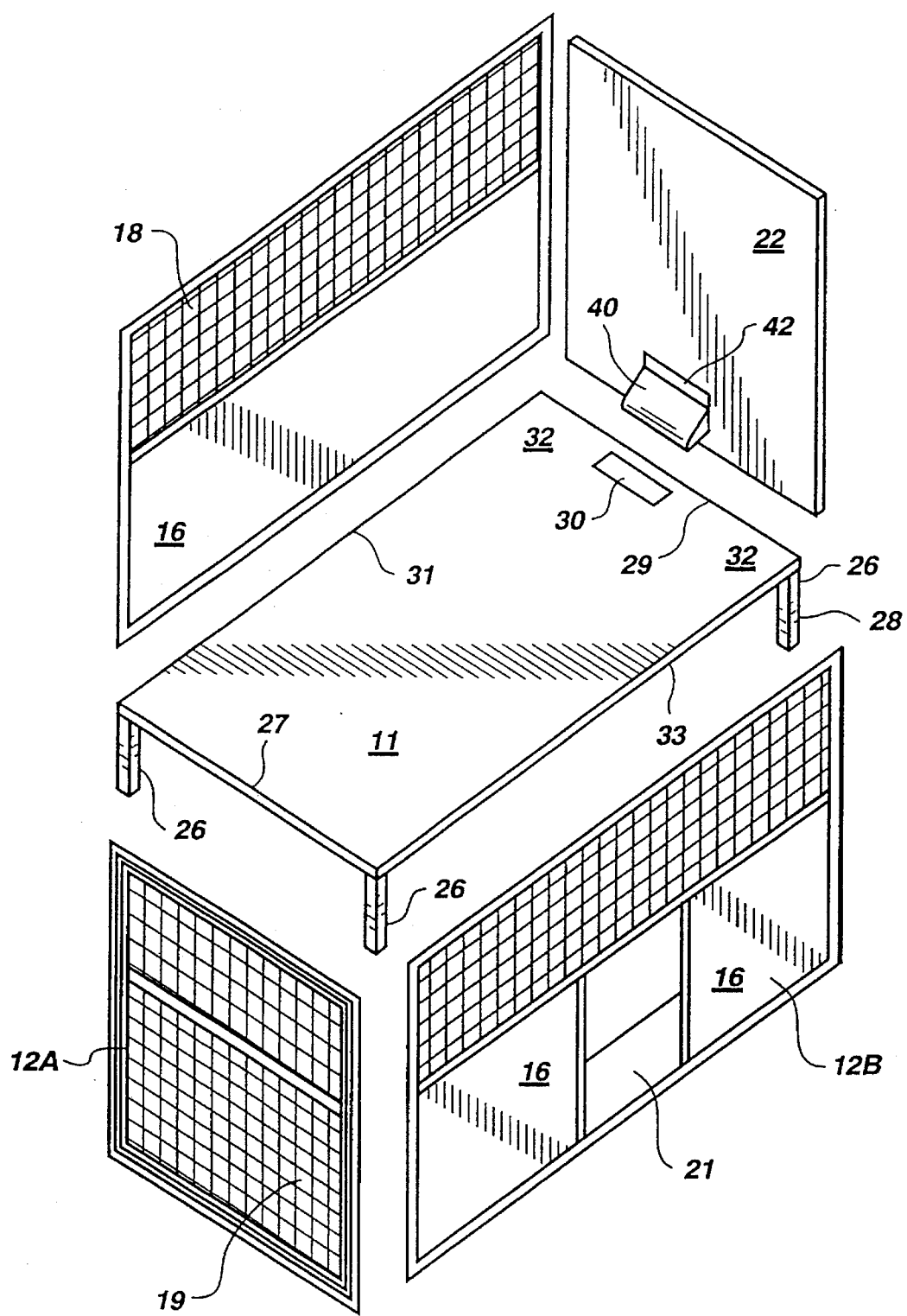
FIG. 4 is an exploded perspective view of the animal cage of the instant invention showing the walls detached from the floor panel.

Each of the wall panels 12, as shown more particularly in FIG. 4, may include two sections 16 and 18. Section 16 is preferably manufactured of a non-porous material, similar to that material which is used to manufacture the floor panel 11. The upper section of the wall 12 may be manufactured of a mesh or wire netting which permits the animal to see outwardly from the interior of the cage 10. Each wall 12 also includes a frame element 17 which extends around the perimeter of the wall. The frame encompasses the sections 16 and 18 of the wall construction. As shown in FIG. 4, each of the walls 12 may by configured to have a generally rectangular appearance. As shown in FIG. 1, each of the walls 12 are positioned on top of floor panel 11 and are interconnected with that floor panel by means of a plurality of brackets 14. Each of these brackets may include a plurality of screws, nails or other attachment structures to secure the bracket to either the wall 12 or the floor panel 11. Each of the wall panels 12 is also interconnected along its vertical edges to the wall panels 12 positioned adjacent thereto.

As shown to advantage in FIG. 1, the walls may be interconnected one with another by a plurality of brackets 14 supplemented by screws or nails which extend into the body of the respective wall panels. The front wall 12A is fitted with a door 19 adapted to be opened to permit the entry of the animal into the cage 10. The door 19 is of conventional construction. The side wall 12B is also fitted with a door 21 which is adapted to be opened to permit the exit of the animal from the cage 10 into an adjacent cage or holding area. The door 21 permits the user to evacuate the animal from the cage 10 during the cage cleaning process so that the animal is not sprayed with the cleaning liquid. In one method of use, the dog is evacuated to a cage positioned adjacent to the cage 10 by means of door 21.

The floor panel 11 is supported above an underlying surface, such as a floor, by a plurality of leg-like members 26. Each of these legs 26 is secured on its upper end against the lower surface of the floor panel 11. In preferred constructions, the floor panel 11 is adapted to be inclined with respect to the horizon. This inclination is obtained by dimensioning the legs 26 such that the legs 26A approximate the edge 27 of the floor panel 11 are configured to have a greater height than the legs 26B which are positioned proximate an opposing end 29 of the floor panel 11. This particular dimensioning of the legs 26 is shown to an advantage in FIG. 7 whereby the inclination of the floor panel 11 is achieved by the varied dimensioning of the legs 26. In those constructions such as shown in FIG. 1 wherein legs 26C are interposed between the legs 26A and 26B along the length of the floor panel 11 similar dimensioning is adapted. That is legs 26C are dimensionally shorter than legs 26A, but taller than the legs 26B. Defined within the floor panel 11 proximate the edge 29 is an opening 30. This opening extends through the entire thickness of floor panel and provides a means whereby waste material collected on the upper surface of floor panel 11 may be evacuated from that surface. As shown in FIG. 4, opening 30 may adopt a somewhat rectangular configuration. The opening 30 is defined in the floor panel 11 to be spatially removed from the edges 31 and 33 of the floor panel 11. This positioning of the opening 30 defines two planar sections 32 of the floor panel 11 which separate the opening 30 from the perspective edges 31 and 33. Positioning of the opening 30 is important in that it provides a means of isolating the collection point for waste materials from the opposing sides of the floor panel 11. The instant invention thereby minimizes the opportunity for waste material to congregate proximate a location contiguous to an adjacent cage structure.

A cover 40 is mounted to the rear wall 22 to extend over and above the opening 30 in the floor panel 11. As shown in FIG. 3, the cover 40 is dimensioned to extend into the interior of the cage 10 sufficiently to cover at a direct vertical access to the opening 30. Furthermore as shown in FIG. 3, the cover 40 may extend sufficiently into the interior of the animal cage to extend into that interior beyond the innermost perimeter of the opening 30. In some embodiments of the invention, as illustrated in FIG. 3, the cover 40 may be secured fixedly to the wall 22 by a plurality of screws or nails 44 which pass through the structure of the cover 40 and into the wall 22. In preferred constructions as shown in FIGS. 2, 6, and 7, the cover 40 is adapted to be detachably secured to the wall 22 by means of a bracket and flange arrangement as shown in advantage in FIGS. 6 and 7.

Figure 2:
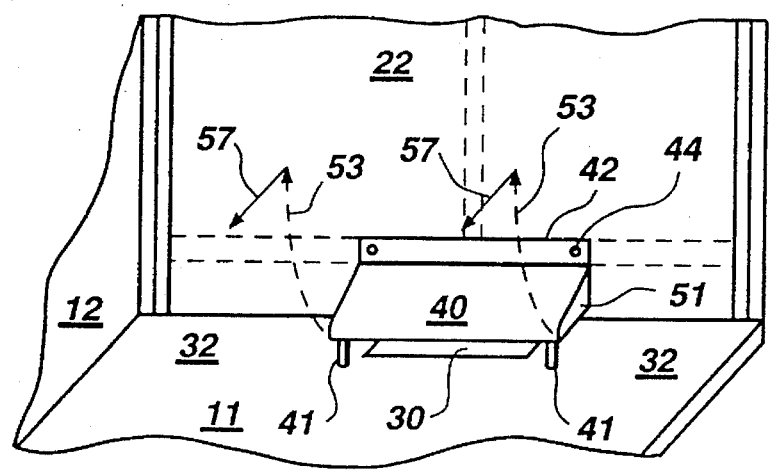
FIG. 2 is an elevational sectional view of the rear wall of the animal cage showing the cover mounted above an opening in the floor panel.
Figure 3:
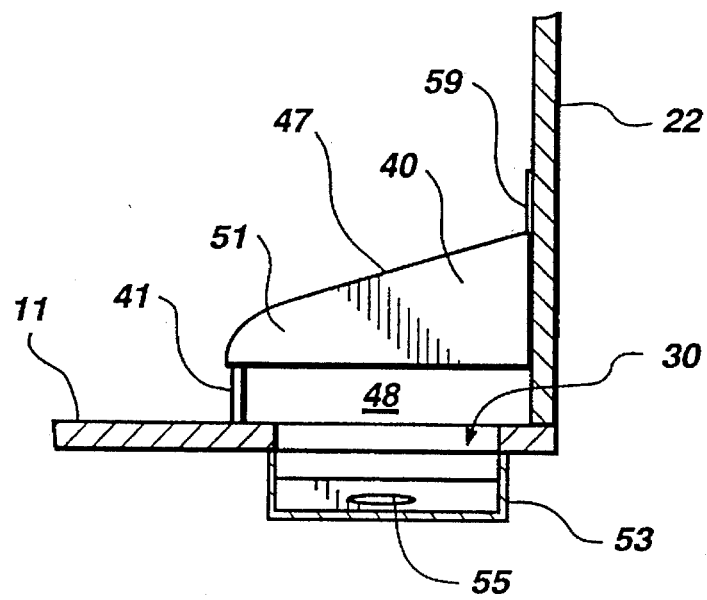
FIG. 3 is an elevated cross sectional side view of the cover and opening of the instant invention.
Figure 6:
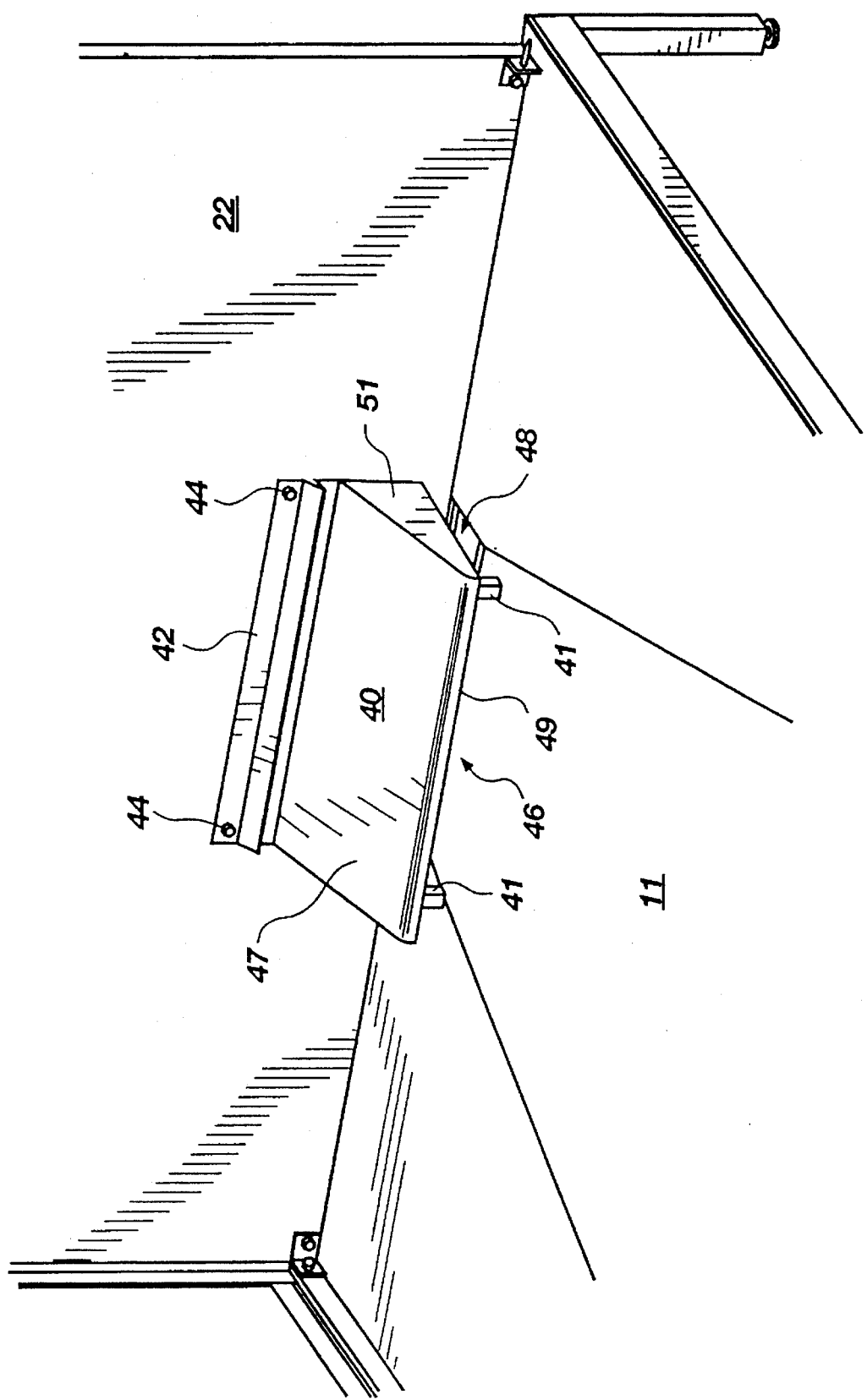
FIG. 6 is a perspective view of the cover of the instant invention positioned over an opening in the floor panel.
Figure 7:
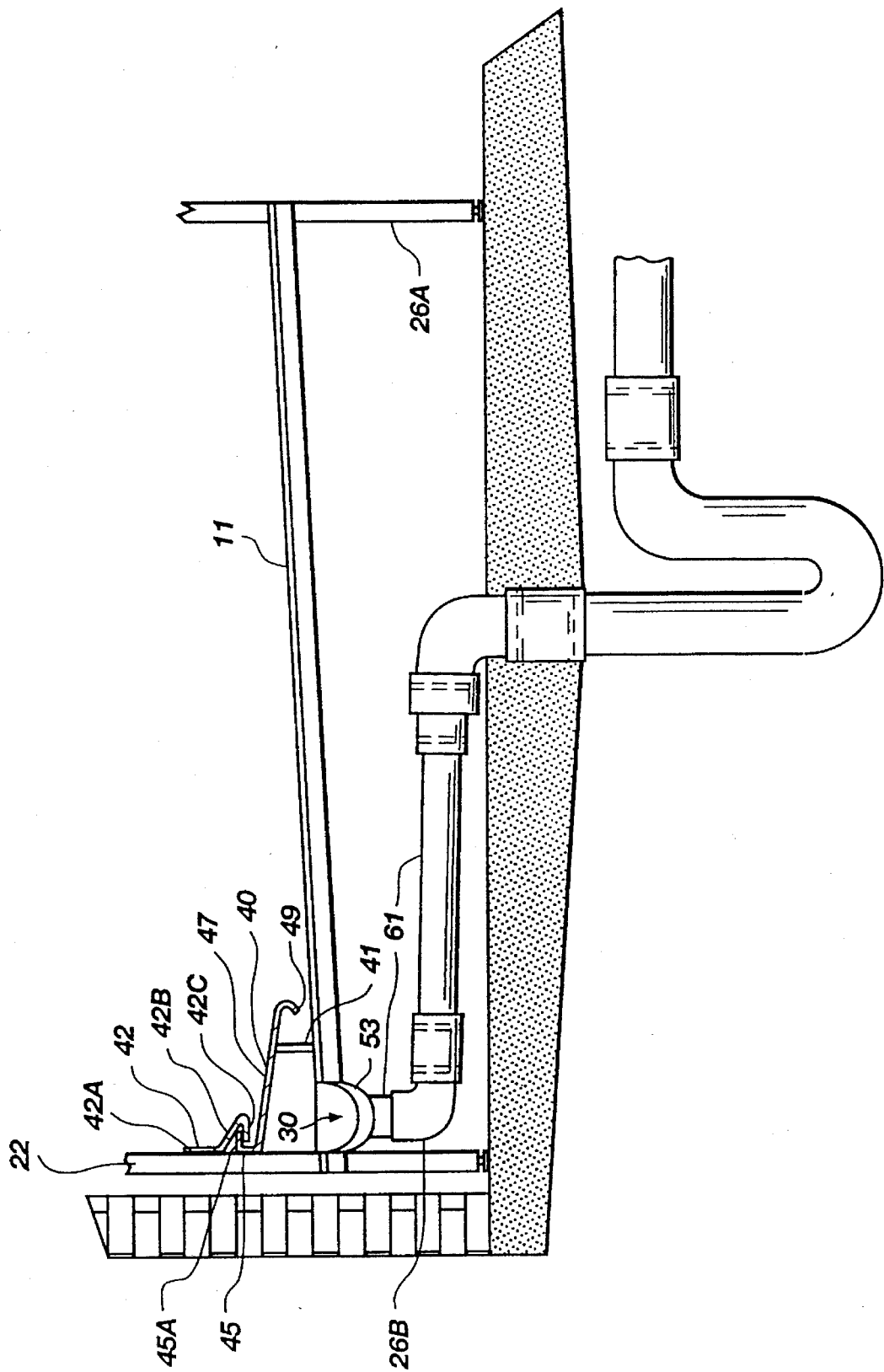
FIG. 7 is an elevational cross-sectional view of the drain channel of the instant invention in association with a cover and floor panel.

As shown particularly in FIGS. 2, 6, and 7, a bracket 42 is secured to wall 22 by two screws 44. The bracket 42, shown in FIG. 7, includes a vertically upstanding section 42A having an angulated extension 42B which extends outwardly from the lower edge of the upstanding section 42A. The extension 42B is fitted at its lower edge with a flange 42C, which extends rearwardly towards the wall 22 to define a ledge upon which the cover 40 may be supported. The flange 42C is positioned so that its edge is spatially removed from the planar surface of wall 22 thereby defining an opening between the end of the flange 42C and the wall 22. This opening permits the ingress and egress of the support flange of the cover 40.

As shown to advantage in FIG. 6, the bracket 42 is an elongate member which extends generally laterally across the wall 22. As shown to advantage in FIG. 7, the cover 40 includes a L-shaped extension or flange 45 fitted on its rear edge. The flange 45 is configured in an inverted L-shape and is adapted to be inserted through the opening between the flange 42C and wall 22 and subsequently positioned such that one leg 45A may be rested on top of the flange 42C of the bracket 42. This arrangement permits the bracket 42 to support the cover 40 in an upright orientation in conjunction with the support legs 41.

As shown to advantage in FIG. 7, the cover 40 includes a generally planar panel 47 which is oriented in an inclined condition to the horizon. The orientation of the panel 47 is adapted to promote the downward flow of any waste material deposited thereon toward the front edge 49 of the cover 40. In order to minimize any potential injury to the animal, the front edge 49 of the cover 40 is configured to present a generally rounded appearance as shown to advantage in FIG. 7. The sides of the cover 40 are fitted with planar side panels 51.

When the cover 40 is in its installed position, a plurality of openings defined between the lower edges of the cover 40 and the upper surface of the floor panel 11 are defined. As shown to advantage in FIG. 6, an opening 48 is deemed between the right vertical side wall 51 of the cover 40 and the upper surface of the floor panel 11. A similar opening 48 is defined on the side opposite from side wall 51. Similarly, an opening 46 is defined at the front of the cover 40. Opening 46 is defined as extending from the upper surface of floor panel 11 to the edge 49 of the cover 40. The opening 46 would also extend laterally between the leg elements 41 as shown in FIG. 6. It should be understood that the height, as well as the width of each of these openings 46 and 48, are specifically dimensioned to permit the entry of waste material while obstructing, if not precluding, the ability of an animal to access the opening 30. This is considered important in that the system is designed to minimize the animal's ability to contact any waste material which has been removed from the interior of the cage 10 and deposited within the opening 30.

In FIG. 2, the removal of the cover 40 from it securement with bracket 42 is illustrated by the lines 53. As illustrated, the front portion of the cover 40 is initially lifted upwardly. This lifting action serves to rotate the cover 40 about its rear edge formed by the flange 45. Once the leg portion 45A of the flange 45 is rotated sufficiently to permit it to be directed downwardly between the opening of the extension 42C and wall 22, the cover 40 is subsequently directed outwardly from the wall 22 as indicated by the second arrow 57 in FIG. 2. This motion removes the cover 40 from engagement with the bracket 42. The removal of the cover 40 by its user permits ready access to the opening 30 for purposes of either removing the waste material 30, which may have been deposited therein, or for purposes of maintenance and cleaning.

As shown in FIG. 3, a catch pan 53 may be secured within the opening 30 to receive any waste material which passes thorough the opening 30. As shown to advantage in FIG. 3, the catch pan 53 may be configured to be a generally U-shaped cross-section pan which extends laterally along the latitudinal length of the opening 30 to form a receptacle for receiving anything which is passed through the opening 30. Configured in the bottom of the catch pan 53 is an opening 55.

As shown to advantage in FIG. 7, the opening 55 may be fitted with a conduit 61. The conduit 61 may be fitted with a plurality of fittings which are adapted to permit the conduit to direct waste entering the opening 55 to a suitable disposal site.

Figure 5:
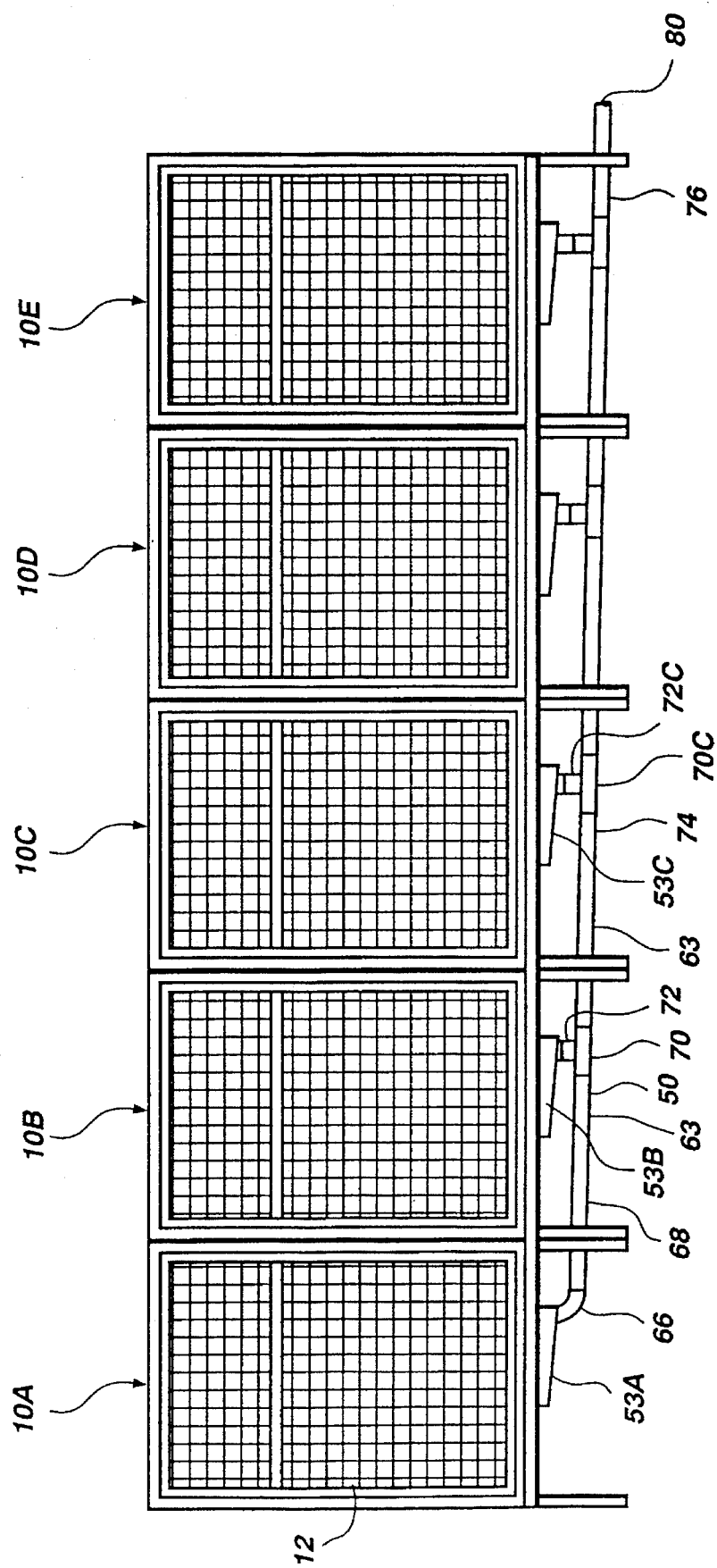
FIG. 5 is a front elevational view of a kennel formed of distinct animal cages of the instant invention having the drain means of each of the channels interconnected.

The animal cage 10 construction is especially adapted for multiple kennel arrangements as shown in FIG. 5. As shown, each of the cages 10 are positioned side by side adjacent one another to form a laterally extending linear army. In this particular construction, it is possible for the individual drain means of the individualized animal cages 10 to be connected one to another to form an unitary drainage system for the kennel. As shown to advantage in FIG. 5, the respective drain pans 53 of the individual cages 10 may be interconnected one to another by a suitable conduit 63. As shown, first kennel 10A may include a drainage pan 53A having an elbow-shaped plumbing fixture 66 secured to the opening 55 therein. The plumbing fixture 66 is thereafter interconnected with an elongate conduit 68 which extends to a T-shaped fitting 70. Fitting 70 is interconnected by a conduit 72 which is fitted within the opening 55 of the catch pan 53 of cage 10B. At the opposing end of the T-element 70, another conduit 74 is adapted to receive waste from the T-element 70 and direct that waste element material from cages 10A and 10B. A connection system similar to that described for cage 10B is thereafter followed for perspective cages 10C, 10D and 10E. Notably the last cage in the array, cage 10E, includes a conduit 76 which is secured to a T-element 70E. Conduit 76 has a free open end 80 which serves as an outlet for waste material. Outlet 80 may be either connected to auxiliary conduit for further channeling of waste material or may be a means of depositing or directing the waste for immediate disposal.

The instant cage construction provides a means by which a user may readily and easily clean the cage by means of a stream of pressurized water. Due to the mesh construction of the front wall 15 of the cage, the user may stand outside the cage and proximate the front wall 12A and direct a stream of water through the structure of the wall 12A itself onto the surfaces 16 of the side walls of the cage, as5 well as onto the rear wall 22 of the cage. Waste material which may have been deposited on the surfaces would thereafter to be directed by gravity to the upper surface of the floor panel 11 of the cage. The user may thereafter further direct a stream of water onto the surface of floor panel 11 and furthermore over the upper surface and inclined surface of panel 47 of the cover 40. Due to the inclined nature of the floor panel 11 and the cover 40, waste material which may be deposited on either one of these surfaces is directed by the force of gravity into the opening 30.

The waste material then passes through the openings 46 and 48 eventually entering the opening 30. Thereafter, the waste drops into drain pan 53 and subsequently enters the conduit 61 by means of opening 55. The conduit 61 thereafter directs the waste material to waste. Notably, once the waste material enters the openings 46 and 48 it is substantially insulated from contact with the animal in cage 10. In kennel arrangements, the waste material is similarly isolated from contact with animals in cages positioned adjacent to the cage wherein the waste material originated. The instant system thereby provides a means of removing the waste material while isolating that material from the animal or animals in the cage or surrounding cages. Furthermore, the use of the solid sidewall panels 16 substantially eliminates the possibility of waste material being transported into adjoining cages during the wash down operation.

It should be understood that the foregoing description of the illustrated embodiments are not intended to be limiting as to the scope of the inventions set forth in the following claims.

What is claimed is:

1. An animal cage comprising:
   an impermeable floor panel having a first end, a second end and two sides, said impermeable floor panel defining an opening thereon disposed proximate said first end, said opening being positioned between said sides wherein a section of section of said impermeable floor panel is positioned between each said side and a perimeter of said opening;

a plurality of walls associated with said impermeable floor panel disposed to be upstanding therefrom to define an enclosure; and a cover mechanically intercooperated with a first said wall, said cover being spacedly positioned above said impermeable floor panel to extend over said opening for restricting access to said opening in said impermeable floor panel to upstanding, spatially restricted access openings defined between said cover and said impermeable floor panel.

2. The animal cage of claim 1, wherein said cover is detachably intercooperated with a bracket secured to said first wall.

3. The animal cage of claim 2, wherein said bracket forms a ledge and said cover includes a flange configured to be positioned on said ledge to be supported thereby, wherein said cover is supported by said bracket.

4. The animal cage of claim 3, wherein said cover includes a planar panel which is inclined to the horizon.

5. The animal cage of claim 1, wherein said second end of said floor panel is positioned elevationally higher than said first end wherein said floor panel is inclined to create a gravity induced flow of waste material placed on said floor panel toward said opening.

6. The animal cage of claim 1, wherein at least two of said walls include a door.

7. The animal cage of claim 1, wherein said opening is connected to a sealed drainage means for conveying waste material from said opening to a disposal site.

8. The animal cage of claim 1 wherein said walls are formed of impermeable material, said walls being sealed to said impermeable floor panel to form a liquid impermeable basin.

9. The animal cage of claim 2 wherein said bracket includes a vertically upstanding section, an outwardly extending section secured to said vertically upstanding section at a lower edge thereof and a flange mounted to said outwardly extending section, said flange being positioned to extend toward said first wall to form a ledge, said flange being spatially removed from said first wall a sufficient distance to define an access opening between said first wall and said flange and said cover including an inverted "L"-shaped flange, one leg of said inverted "L"-shaped flange being configured to pass through said access opening and rest on said ledge whereby said cover is supported by said ledge.

10. A kennel comprising a plurality of animal cages arrayed adjacent one another; each said animal cage comprising:

an impermeable floor panel having a first end, a second end and two sides; said impermeable floor panel defining an opening thereon disposed proximate said first end, said opening being positioned between said sides wherein a section of said impermeable floor panel is positioned between each said side and a perimeter of said opening;

a plurality of walls associated with said impermeable floor panel disposed to be upstanding therefrom to define an enclosure;

a cover mechanically intercooperated with a first said wall, said cover being spacedly positioned above said impermeable floor panel for restricting access to said opening in said impermeable floor panel to upstanding, spatially restricted access openings defined between said cover and said impermeable floor panel;

said opening being connected to a sealed drainage means for conveying waste material from said opening to a disposal site; and wherein said drainage means of said animal cages are interconnected one to another.

11. The kennel of claim 10, wherein said drainage means of at least one said animal cage is positioned elevationally higher than said drainage means to an adjacent animal cage wherein waste flows from said drainage means positioned elevationally higher to said drainage means of said adjacent animal cage.

12. The kennel of claim 10 wherein an arrangement of said drainage means of said animal cages is substantially sealed except for its intercommunication with each said opening of each of said animal cages and an outlet.

* * * * *